US008737512B2

(12) United States Patent
Tan et al.

(10) Patent No.: US 8,737,512 B2
(45) Date of Patent: May 27, 2014

(54) METHOD AND APPARATUS FOR SELECTING TRANSMISSION MODE

(75) Inventors: Yuanchun Tan, Shenzhen (CN); Liping Liu, Shenzhen (CN); Xianxi Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/502,667

(22) PCT Filed: May 12, 2010

(86) PCT No.: PCT/CN2010/072678
§ 371 (c)(1),
(2), (4) Date: Apr. 18, 2012

(87) PCT Pub. No.: WO2010/145359
PCT Pub. Date: Dec. 23, 2010

(65) Prior Publication Data
US 2012/0207238 A1    Aug. 16, 2012

(30) Foreign Application Priority Data
Oct. 21, 2009    (CN) .......................... 2009 1 0180907

(51) Int. Cl.
H04B 7/02    (2006.01)

(52) U.S. Cl.
USPC ............................. 375/267; 370/252; 455/69

(58) Field of Classification Search
None
See application file for complete search history.

(56) References Cited

U.S. PATENT DOCUMENTS

| 2009/0086648 A1* | 4/2009 | Xu et al. ........................ 370/252 |
| 2009/0207784 A1 | 8/2009 | Lee et al. |
| 2009/0262856 A1* | 10/2009 | Onggosanusi et al. ....... 375/267 |
| 2010/0304691 A1* | 12/2010 | Goransson et al. ............ 455/69 |

FOREIGN PATENT DOCUMENTS

| CN | 101388699 A | 3/2009 |
| CN | 101414864 A | 4/2009 |
| CN | 101491049 A | 7/2009 |
| CN | 101534527 A | 9/2009 |

OTHER PUBLICATIONS

Int'l Search Report issued Aug. 19, 2010 in Int'l Application No. PCT/CN2010/072678.
Extended European Search Report issued Apr. 8, 2013 in EP Application No. 10788755.6.
"Proposed Changes/Refinements to Sections 11.8 and 11.12 of IEEE 802.16m SDD (802.16m=08/003r9a); C80216m-09 1201," IEEE Draft, vol. 802.16m, pp. 1-43 (Jul. 3, 2009).

* cited by examiner

Primary Examiner — Leon-Viet Nguyen
(74) Attorney, Agent, or Firm — Panitch Shwarze Belisario & Nadel LLP

(57) ABSTRACT

The present invention provides a method and an apparatus for processing a precoder. The method comprises: step A: a base station determining whether the number of received effective precoders reported by a certain UE is greater than or equal to a threshold a, if so, executing step B, otherwise, executing step D; step B: the base station determining whether each received effective precoder is according to the same number of layers, if so, executing step C, otherwise, executing step D; step C: the base station determining whether a variation speed of each effective precoder is fast, if so, applying a transmit diversity transmission mode to the UE, otherwise, applying a MIMO transmission mode to the UE; and step D: applying the MIMO transmission mode to the UE. Therefore, the present invention can reasonably predict the transmission mode and the precoder that should be employed in the transmission mode at current time for a certain UE.

19 Claims, 3 Drawing Sheets

METHOD AND APPARATUS FOR SELECTING TRANSMISSION MODE

CROSS-REFERENCE TO RELATED APPLICATION

This application is a Section 371 of International Application No. PCT/CN2010/072678, filed May 12, 2010, which was published in the Chinese language on Dec. 23, 2010, under International Publication No. WO 2010/145359 A1, and the disclosure of which is incorporated herein by reference.

FIELD OF THE INVENTION

The present invention belongs to the technical field of communication, and in particular relates to a method and apparatus for processing a precoder.

BACKGROUND OF THE INVENTION

In a wireless communication system, in order to improve data transmission rate and system throughput, a Multi-Input and Multi-Output (MIMO) technology can be adopted to transmit one or more data streams via MIMO channels in a way of being capable of acquiring the maximum system throughput of data transmission of the system, so as to realize good performance of the system.

A precoding technology is to perform linear variation on a spatial domain to a signal to be transmitted through a precoding matrix (vector) in a base station according to a channel state, so as to reach an affect of changing channel equivalently. Furthermore, the precoding technology can significantly improve the performance of a MIMO system. In a Frequency Division Duplex (FDD) mode, a User Equipment (UE) is required to feed the precoding matrix back to a base station. At present, regarding the processing of precoder, the general processing method is that the base station employs the precoder recently reported by the UE to perform the precoder processing. Due to a time delay of processing and feedback (for example, in a Long Term Evolution (LTE) system, there is a time delay of 5 milliseconds when the precoder is transmitted from the UE to the scheduler of the base station), and time-varying characteristic of wireless channels, the above-mentioned processing method may cause that the precoder employed by the base station cannot properly match with a current radio link. However, it is necessary that the scheduler of the base station processes the precoder fed back by the UE before using the precoder.

SUMMARY OF THE INVENTION

The technical problem to be solved by the present invention is to provide a method and apparatus for processing a precoder, so as to reasonably predict a transmission mode which should be currently employed by a certain UE and a precoder that should be employed in the transmission mode by the UE.

For solving the above technical problem, the present invention provides a method for processing a precoder. The method comprises the following steps: step A, a base station determines whether the number of received effective precoders reported by a certain UE is greater than or equal to a threshold a, if so, execute step B, otherwise, execute step D; step B, it is determined whether each received effective precoder is according to the same number of layers, if so, execute step C, otherwise, execute step D; step C, it is determined whether the variation speed of each effective precoder is fast according to a predetermined rule of a variation speed of a precoder, if so, a transmit diversity transmission mode is applied to the UE, otherwise, a MIMO transmission mode is applied to the UE; and step D, the MIMO transmission mode is applied to the UE. Wherein the variation of each effective precoder is a successive relation formed by each effective precoder that is received by the base station successively; the effective precoders are precoders reported by the UE and received by the base station in a most recent period L, wherein the period L ranges from 8 milliseconds to 200 milliseconds, and the threshold a ranges from 4 to 10.

Preferably, the rule of determining the variation speed of each effective precoder in step C comprises: according to a predetermined rule of determining the variation speed of vector of each precoder in the layer that each effective precoder is according to, the variation speed of vector of each effective precoder in each layer is determined respectively; if the number of the layers in which the variation of vector of each effective precoder is fast reaches a preset threshold d, then the variation speed of each effective precoder is considered to be fast; wherein the layers are those that each effective precoder is according to, i.e., those corresponding to the Rank Indicator (RI); the threshold d is an integer which is greater than or equal to 1 and less than or equal to the number of layers that each effective precoder is according to; preferably, the threshold d is set as the number of layers that each effective precoder is according to; wherein the variation of vector of each effective precoder in each layer is a successive relation formed by the vectors, in the layer, of each effective precoder that is received by the base station successively.

Preferably, the rule of determining the variation speed of vector of each precoder in the layers that each effective precoder is according to is:

according to a predetermined rule of determining, in the layer, the variation speed of element at the same position of vector of each effective precoder, sequentially determining, in the layer, the variation speed of element at each same position of vector of each effective precoder; if the number of the positions at which the variation speed is fast is greater than a threshold c, then considering the variation speed of vector of each effective precoder to be fast in the layer, otherwise, considering the variation speed of vector of each effective precoder to be not fast in the layer; wherein the threshold c is an integer which is greater than or equal to 1 and less than or equal to the number of elements in the vector of the effective precoder; preferably, the threshold c is set as 1; the variation of element at the same position of vector of each effective precoder is a successive relation formed by the elements at the same position of vector, in the layer, of each effective precoder that is received by the base station successively.

Preferably, the rule of determining the variation speed of element at the same position of vector of each effective precoder in the layer comprises:

step 1: a precoder reception window and a precoder trend determination window are preset;

wherein the precoder reception window is used for receiving the precoders reported by the UE, the length of the precoder reception window is equal to the period L, and the precoders in the precoder reception window is the effective precoders;

the objects received by the precoder trend determination window are also the precoders reported by the UE; the precoder trend determination window is used for determining the variation trend of the precoders and is a subset of the precoder reception window, and the length of the precoder trend determination window is less than that of the precoder reception window;

step 2: divide a distribution type of elements at the same position of the precoding vector of each precoder, which is in the precoder reception window and the precoder trend determination window, in the layer; and step 3: the following determination is made based on step 1 and step 2:

when the distribution type in the precoder reception window is static distribution or correlation distribution, considering the variation speed of element at the same position of the vector of each effective precoder to be not fast in the layer;

when the distribution type in the precoder reception window is jump distribution, further determining whether the distribution type in the precoder trend determination window is static distribution, if so, considering the variation speed of element at the same position of the vector of each effective precoder to be not fast in the layer, otherwise, considering the variation speed of element at the same position of the vector of each effective precoder to be fast; and when the distribution type in the precoder reception window is regional distribution or scattered distribution, further determining whether the distribution type in the precoder trend determination window is static distribution or correlation distribution, if it is static distribution, considering the variation speed of element at the same position of the vector of each effective precoder to be not fast in the layer, if it is correlation distribution, considering the variation speed of element at the same position of the vector of each effective precoder to be fast.

Preferably, step C further comprises: if it is determined to apply the MIMO transmission mode to the UE, then a precoder that should be employed by the current MIMO transmission is determined according to the following solution: the base station employs a precoder recently reported by the UE to perform the MIMO transmission, but if it is determined, according to the predetermined rule of determining the variation speed of vector of each precoder in the layer that each effective precoder is according to, that there exists a layer in which the variation of vector of each effective precoder is fast, then the precoder employed by the base station is the one obtained by removing, from the precoder recently reported by the UE, the vector to which the layer with fast variation speed corresponds.

Preferably, step D further comprises: the precoder that should be employed by the current MIMO transmission is determined according to the following solution:

when the number of layers to which the RI recently reported by the UE corresponds is less than or equal to that employed currently, employing the precoder recently reported by the UE to perform the MIMO transmission; note that, the RI recently reported by the UE comprises a current Transmission Time Interval (TTI).

When the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

For solving the above-mentioned technical problem, the present invention further provides an apparatus for processing a precoder. The apparatus comprises: a precoder reception module and a transmission mode selection module, wherein the precoder reception module is used for receiving a precoder reported by a user equipment (UE); and the transmission mode selection module is used for determining whether the number of effective precoders reported by the UE and received by a base station is greater than or equal to a threshold a, if the number of effective precoders is greater than or equal to the threshold a, further determining whether each received effective precoder is according to the same number of layers, if each received effective precoder is according to the same number of layers, further determining whether a variation speed of each effective precoder is fast, if the variation speed is fast, determining that the base station applies a transmit diversity transmission mode to the UE, otherwise, determining that the base station applies a Multi-Input and Multi-Output (MIMO) transmission mode to the UE; wherein the effective precoders are precoders reported by the UE and received by the base station in a most recent period L.

The predetermined rule of determining the variation speed of the precoder in step C is:

according to a predetermined rule of determining the variation speed of vector of each precoder in the layer that each effective precoder is according to, the variation speed of vector of each effective precoder in each layer is determined respectively; if the number of the layers in which the variation of vector of each effective precoder is fast reaches a preset threshold d, then the variation speed of each effective precoder is considered to be fast; wherein the layers are those that each effective precoder is according to, i.e., those corresponding to the Rank Indicator (RI); the threshold d is an integer which is greater than or equal to 1 and less than or equal to the number of layers that each effective precoder is according to; preferably, the threshold d is set as the number of layers that each effective precoder is according to;

the variation of vector of each effective precoder in each layer is a successive relation formed by the vectors, in the layer, of each effective precoder that is received by the base station successively.

Preferably, the apparatus for processing a precoder further comprises a first precoder determination module which is used for determining a precoder that should be employed by the current MIMO transmission according to the following solution:

the base station employs the precoder recently reported by the UE to perform the MIMO transmission, but if there exist a layer in which the variation of vector of each effective precoder is fast according to the predetermined rule of determining the variation speed of vector of each precoder in the layers that each effective precoder is according to, then the precoder employed by the base station is the one obtained by removing, from the precoder recently reported by the UE, the vector to which the layer with fast variation speed corresponds.

Preferably, the apparatus for processing a precoder further comprises a second precoder determination module which is used for determining a precoder that should be employed by the MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

The beneficial effect of the present invention is that:

compared with the prior art, the method and apparatus for processing a precoder employed by the present invention can reasonably predict that the UE should employ the MIMO transmission mode or the transmit diversity transmission mode at current time, and the precoder information that is needed in the MIMO transmission mode by collecting, analyzing and processing the precoder information reported by the UE through the base station, so that the performance of the MIMO channels is greatly improved.

DETAILED DESCRIPTION OF THE EMBODIMENTS

Figure 1:
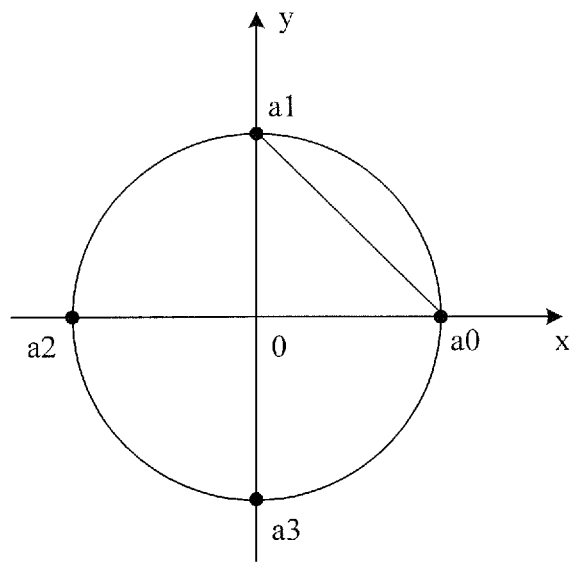
FIG. 1 shows a schematic diagram of phase distribution of elements in a precoding matrix in the MIMO channel with 2 transmitting antennae and 2 receiving antennae.

The present invention is further described below with reference to the accompanying drawings and embodiments in detail.

Here, the phase distribution of elements in the precoding matrix in the MIMO channel is described first, mainly comprising:

I. in the LTE system, the number of the transmitting antenna is 2 and the number of the receiving antenna is 2, and a precoder codebook set used in the MIMO transmission in which the UE feeds back the precoders is shown in the following Table 1.

TABLE 1

| Codebook index | Number of layers $v$ | |
| --- | --- | --- |
| | 1 | 2 |
| 0 | $\frac{1}{\sqrt{2}}\begin{bmatrix}1\\1\end{bmatrix}$ | — |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

II. in the LTE system, the number of the transmitting antenna is 4 and the number of the receiving antenna is 4, and the precoder codebook set used in the MIMO transmission in which the UE feeds back the precoders is shown in the following Table 2.

TABLE 2

| Codebook index | Vector $u_n$ | Number of layers $v$ | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | wherein $W_n = I - 2u_n u_n^H / u_n^H u_n$, $W_n^{\{s\}}$ represents taking out the column in the set $\{s\}$ from the matrix $W_n$.

Regarding the element in each precoding matrix (vector) in Table 1, only the phase, but not the amplitude, is considered, so the element can be represented by any one of a0, a1, a2 and a3 on the unit circle in FIG. 1. Here, in FIG. 1, the x-axis represents the real axis, the y-axis represents the imaginary axis, and a0, a1, a2 and a3 represent the unit vectors whose phases are 0, $\pi/2$, $\pi$ and $3\pi/2$, respectively.

Figure 2:
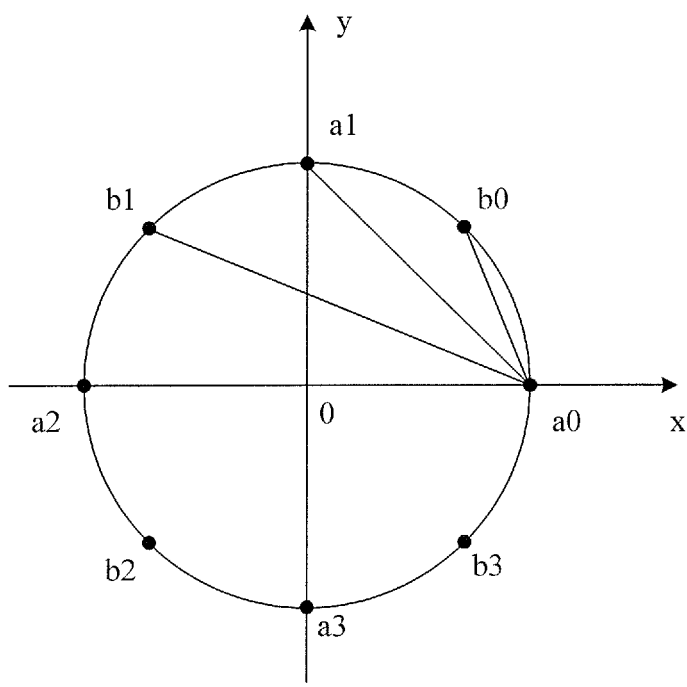
FIG. 2 shows a schematic diagram of phase distribution of elements in a precoding matrix in the MIMO channel with 4 transmitting antennae and 4 receiving antennae.

Regarding the element in each precoding matrix (vector) in Table 2, only the phase, but not the amplitude, is considered, so the element can be represented by any one of a0, b0, a1, b1, a2, b2, a3 and b3 on the unit circle in FIG. 2. Here, in FIG. 2, the x-axis represents the real axis, the y-axis represents the imaginary axis, and a0, b0, a1, b1, a2, b2, a3 and b3 represent the unit vectors whose phases are 0, $\pi/4$, $\pi/2$, $\pi 3/4$, $\pi$, $\pi 5/4$, $3\pi/2$ and $\pi 7/4$, respectively.

Figure 3:
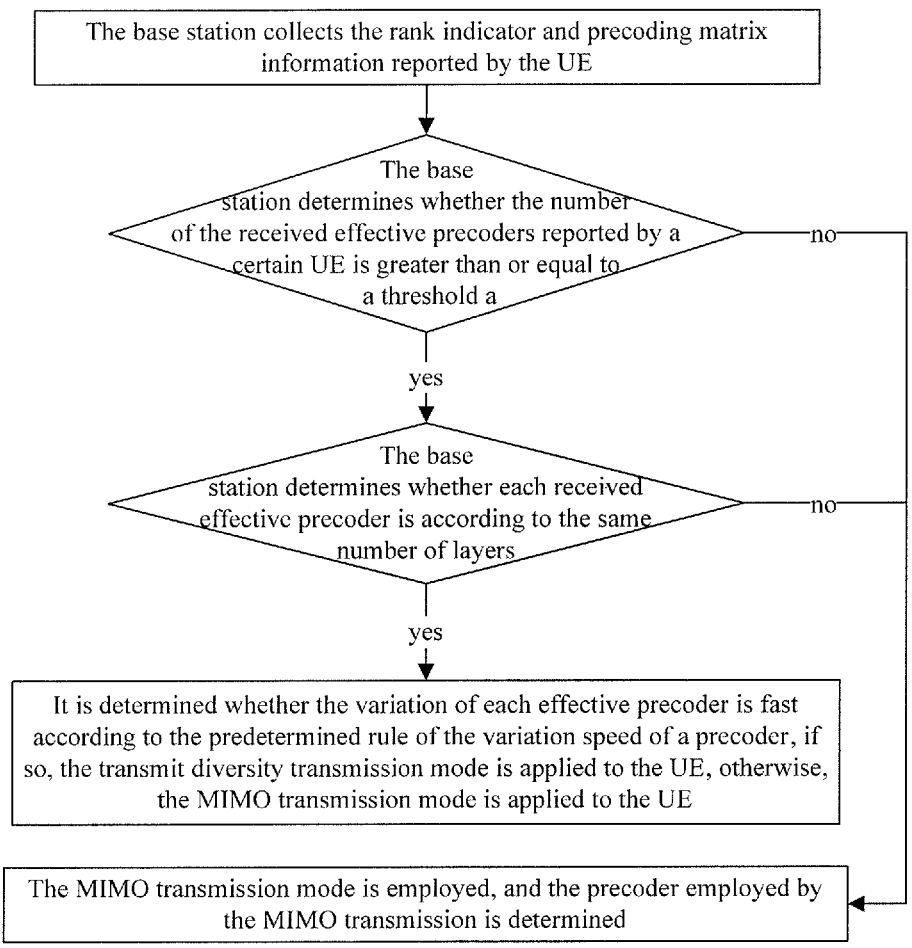
FIG. 3 shows a flowchart of a method for processing a precoder according to the present invention.

FIG. 3 shows a flowchart of realizing a preferable embodiment of the method for processing a precoder according to the present invention, wherein the embodiment mainly comprises the steps as follows.

Step I: a base station collects an RI and precoding matrix information reported by a UE.

Step II: the base station determines whether the number of received effective precoders reported by a certain UE is greater than or equal to a threshold a, if so, execute Step III, otherwise, execute Step V.

Wherein the variation of each effective precoder is the successive relation formed by each effective precoder that is received by the base station successively.

In this step, the effective precoders received by the base station are those reported by the UE and received by the base station in the most recent period L, the precoders reported by the UE are on an effective time domain, and the effective time domain means the time range of L milliseconds from L−1 milliseconds before the current time to the current time. The L depends on the minimum of the number of transmitting antennae and the number of receiving antennae of the MIMO channel, a precoder set employed by the base station and the UE, and a precoder reporting cycle. Generally, the greater the minimum of the number of transmitting antenna and the number of receiving antenna of the MIMO channel is, and/or the greater the precoder set employed by the base station and the UE is, and/or the longer the precoder reporting cycle is, the greater the L is; typically, they are in linear relation. The value of L ranges from 8 milliseconds to 200 milliseconds.

Note that, the value of L should ensure that the number of effective precoders reported by the UE is able to be greater than the threshold a, and the threshold a ranges from 4 to 10. Note that, from the time that the base station receives the first precoder reported by the UE to the time added with L−1, the effective time domain linearly increases from 1 millisecond to L milliseconds. Note that, after the base station, at a certain time, clears the effective precoders of this time, the new effective time domain is counted from the time that the base station receives the next precoder reported by the UE.

Step III: the base station determines whether each received effective precoder is according to the same number of layers, if so, execute Step IV, otherwise, execute Step V.

Step IV: the base station determines whether the variation speed of each effective precoder is fast according to a predetermined rule of the variation speed of a precoder, if so, apply a transmit diversity transmission mode to the UE, otherwise, apply a MIMO transmission mode to the UE.

In this step, if it is if it is determined to apply the MIMO transmission mode to the UE, then the precoder that is employed by the current MIMO transmission is determined according to the following solution: the base station employs the precoder recently reported by the UE to perform the MIMO transmission, but if there exists, according to the predetermined rule of determining the variation speed of vector of each precoder in the layers that each effective precoder is according to, a layer in which the variation speed of vector of each effective precoder is fast, then the precoder employed by the base station is the one obtained by removing, from the precoder recently reported by the UE, the vector to which the layer with fast variation speed corresponds. Correspondingly, in the current MIMO transmission, the number of layers employed by the base station is obtained by subtracting 1 from the number of layers to which the RI recently reported by the UE corresponds, wherein the number of layers to which the RI corresponds is the number of layers of the precoder to which the RI corresponds.

Preferably, according to the embodiment, the predetermined rule of the variation speed of the precoder is as follows:

respectively determining, according to a predetermined rule of determining the variation speed of vector of each effective precoder in the layers that each effective precoder is according to, the variation speed of vector of each effective precoder in each layer; if the number of the layers in which the variation speed of vector of each effective precoder is fast reaches a preset threshold d, then the variation speed of each effective precoder is considered to be fast; the concept of the above layers means the layers that each effective precoder is according to, i.e., those corresponding to the RI; the threshold d is an integer which is greater than or equal to 1 and less than or equal to the number of layers that each effective precoder is according to; in the embodiment, the threshold d is set as the number of layers that each effective precoder is according to;

wherein the variation of vector of each effective precoder in each layer is the successive relation formed by the vectors, in the layer, of each effective precoder that is received by the base station successively.

Of course, in the embodiment, the predetermined rule of the variation speed of precoder can also adopt any other feasible solution.

Furthermore, in the embodiment, the predetermined rule of determining the variation speed of vector of each precoder in the layers that each effective precoder is according to is:

sequentially determining, in the layer, the variation speed of element at each same position of vector of each effective precoder, according to a predetermined rule of determining, in the layer, the variation speed of element at the same position of vector of each effective precoder; if the number of positions at which the variation speed is fast is greater than a threshold c, then considering the variation speed of vector of each precoder to be fast in the layer, otherwise, considering the variation speed of vector of each precoder to be not fast in the layer; wherein the threshold c is an integer which is greater than or equal to 1 and less than or equal to the number of elements in the vector of the effective precoder; in the embodiment, the threshold c is set as 1.

The variation of element at the same position of vector of each effective precoder is: the successive relation formed by the elements at the same position of vector, in the layer, of each effective precoder that is received by the base station successively.

Of course, in the embodiment, the predetermined rules of determining the variation speed of vector of each precoder in the layers that each effective precoder is according to can also adopt any other feasible solution.

Furthermore, in the embodiment, the predetermined rule of determining the variation speed of element at the same position of vector of each effective precoder in the layer comprises steps as follows.

Step 1: a precoder reception window and a precoder trend determination window are preset.

Figure 4:
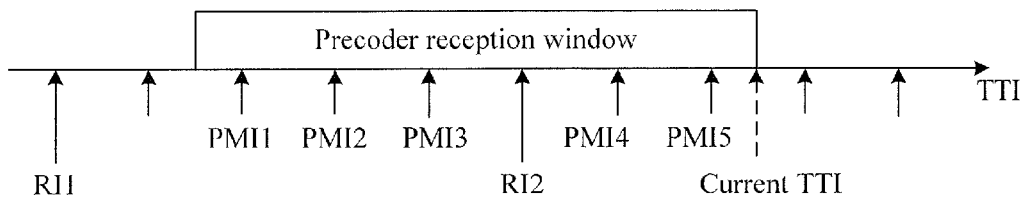
FIG. 4 shows a schematic diagram of distribution of rank indicators and the precoders in the precoder reception window.

In the above, the precoder reception window is used for receiving precoder information reported by the UE and the RI information that the precoders are according to. The distribution of IIIs and the precoders in the precoder reception window is shown in FIG. 4. In FIG. 4, the RI1 and RI2 represent 2 rank indicators, respectively; the PMI1 to PMI5 represent 5 precoders, respectively; and the TTI is the transmission time interval.

The length of the precoder reception window is equal to the preceding time period L, and the precoders in the precoder reception window are effective precoders. The length of the precoder reception window depends on the minimum of the number of transmitting antennae and the number of receiving antennae of the MIMO channel, the precoder set employed by the base station and the UE, and the precoder reporting cycle. Generally, the greater the minimum of the number of transmitting antenna and the number of receiving antenna of the MIMO channel is, and/or the greater the precoder set employed by the base station and the UE is, and/or the longer the precoder reporting cycle is, the longer the precoder reception window is; typically, they are in linear relation. Ensure that, the number of precoders received by the precoder reception window should be greater than the threshold a, generally, the threshold a is greater than or equal to 4.

Figure 5:
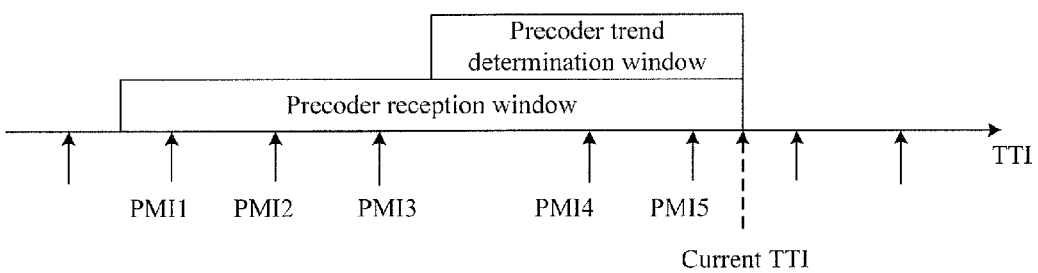
FIG. 5 shows a schematic diagram of relationship between a precoder reception window and a precoder trend determination window.

The object received by the precoder trend determination window is also the precoder information reported by the UE and the RI information that the precoders are according to. The precoder trend determination window is a subset of the precoder reception window and used for determining the variation trend of the precoders; the length of the precoder trend determination window is less than that of the precoder reception window, generally ⅓ to ½ of that of the precoder reception window (rounded up). The length of the precoder trend determination window is set as L' which ranges from 4 milliseconds to 100 milliseconds. Ensure that, the number of precoders received by the precoder trend determination window should be greater than or equal to a threshold E which ranges from 2 to 5. The precoder trend determination window lies within the range of L milliseconds from the L−1 milliseconds before the current TTI time to the current TTI time. The relationship between the precoder reception window and the precoder trend determination window is shown in FIG. 5.

Step 2: the distribution type of elements at the same position of the precoding vector of each precoder in the layer is divided, wherein the precoder is in the precoder reception window and the precoder trend determination window; the distribution type in the precoder reception window is as follows.

Distribution 1, a static distribution, which means that the phases of elements at the same position of the vector of each precoder, which is in the precoder reception window, in the layer are constant; for example, regarding the MIMO channel with 2 transmitting antennae and 2 receiving antennae, the elements are all distributed in the set {a0} in FIG. 1; and regarding the MIMO channel with 4 transmitting antennae and 4 receiving antennae, the elements are all distributed in the set {b0} in FIG. 2.

Distribution 2, a correlation distribution, which means that the phase difference of elements at the same position of the vector of each precoder, which is in the precoder reception window, in the layer does not exceed π/2; for example, regarding the MIMO channel with 2 transmitting antennae and 2 receiving antennae, the elements are distributed in the set {a0, a1} in FIG. 1; and regarding the MIMO channel with 4 transmitting antennae and 4 receiving antennae, the elements are distributed in the set {a0, b0, a1} in FIG. 2.

Distribution 3, a jump distribution, which means that the phase difference of elements at the same position of the vector of each precoder, which is in the precoder reception window, in the layer is π; for example, regarding the MIMO channel with 2 transmitting antennae and 2 receiving antennae, the elements are distributed in the set {a0, a2} in FIG. 1; and regarding the MIMO channel with 4 transmitting antennae and 4 receiving antennae, the elements are distributed in the set {b0, b2} in FIG. 2.

Distribution 4, a regional distribution, which means that the phase difference of elements at the same position of the vector of each precoder, which is in the precoder reception window, in the layer does not exceed π, and the elements are only distributed on a certain semicircle of the unit circle; for example, regarding the MIMO channel with 2 transmitting antennae and 2 receiving antennae, the elements are distributed in the set {a0, a1, a2} in FIG. 1; and regarding the MIMO channel with 4 transmitting antennae and 4 receiving antennae, the elements are distributed in the set {b0, a1, b1, a2, b2} in FIG. 2.

Distribution 5, a scattered distribution, which means that the phases of elements at the same position of the vector of each precoder, which is in the precoder reception window, in the layer are distributed on the whole unit circle; for example, regarding the MIMO channel with 2 transmitting antennae and 2 receiving antennae, the elements are distributed in the set {a0, a1, a2, a3} in FIG. 1; and regarding the MIMO channel with 4 transmitting antennae and 4 receiving antennae, the elements are distributed in the set {b0, a1, b1, a2, b2, a3, b3} in FIG. 2.

In the above, the precoder trend determination window is only used for the condition that the above-mentioned distribution types in the precoder reception window are the jump distribution, the regional distribution or the scattered distribution. The distribution types in the precoder trend determination window comprise the distribution 1, the distribution 2 and other distributions, the definition of the distribution 1, i.e. static distribution and the distribution 2, i.e. the correlation distribution in the precoder trend determination window is accordant with that of the static distribution and the correlation distribution in the precoder reception window, and the other distributions in the precoder trend determination window are that except the static distribution and the correlation distribution.

Note that, in the LTE system, the precoders in two layers have only two values, and the distribution types thereof are only classified into the static distribution and the jump distribution.

Step 3: the following determination is made based on Step 1 and Step 2:

when the distribution type in the precoder reception window is the distribution 1 or the distribution 2, the variation of element at the same position of the vector of each effective precoder in the layer is not considered to be fast;

when the distribution type in the precoder reception window is the distribution 3, it is further determined whether the distribution type in the precoder trend determination window is the distribution 1, if so, the variation of element at the same position of the vector of each effective precoder in the layer is not considered to be fast, otherwise, it is considered to be fast;

when the distribution type in the precoder reception window is the distribution 4 or the distribution 5, it is further determined whether the distribution type in the precoder trend determination window is the distribution 1 or the distribution 2, if it is the distribution 1, the variation of element at the same position of the vector of each effective precoder in the layer is not considered to be fast, if it is the distribution 2, it is considered to be fast.

Note that, when the related distribution types in the precoder reception window are different, the lengths of the precoder trend determination window are different too. When the distribution type in the precoder reception window is the jump distribution, the length of the precoder trend determination window is ⅓ to ½ of that of the precoder reception window (rounded up). When the distribution type in the precoder reception window is the regional distribution, the length of the precoder trend determination window is min{⅓ to ½ of the length of the precoder reception window (rounded up), the length of the precoder reception window-deltaN1}, wherein the value of delataN1 is set as: regarding the MIMO channel with 2 transmitting antennae and 2 receiving antennae, being greater than or equal to 3 and less than the length of the precoder reception window; regarding the MIMO channel with 4 transmitting antennae and 4 receiving antennae, being greater than or equal to 5 and less than the length of the precoder reception window. When the distribution type in the precoder reception window is the scattered distribution, the length of the precoder trend determination window is min{⅓ to ½ of the length of the precoder reception window (rounded up), the length of the precoder reception window-deltaN2}, wherein the value of deltaN2 is set as: regarding the MIMO channel with 2 transmitting antennae and 2 receiving antennae, being greater than or equal to 4 and less than the length of the precoder reception window; regarding the MIMO channel with 4 transmitting antennae and 4 receiving antennae, being greater than or equal to 6 and less than the length of the precoder reception window.

Of course, in the present invention, the predetermined solution of determining the variation speed of element at the same position of vector of each effective precoder in the layer can also be any other feasible solution, typically, determining by the variance way.

Step V: the MIMO transmission mode is employed, and the precoder employed by the current MIMO transmission is determined.

In this step, the precoder employed by the current MIMO transmission is determined mainly according to the following solution:

I) when the number of layers to which the RI recently reported by the UE corresponds is less than or equal to that employed currently, the precoder recently reported by the UE is employed to perform the MIMO transmission;

II) when the number of layers to which the RI recently reported by the UE corresponds is greater than that employed currently, the following processing procedures are performed:

i) under a condition that the number of receiving antennae and the number of transmitting antennae are both 2, a precoding vector to which a layer corresponds is selected from a precoder recently reported by the UE as the precoder employed by the current MIMO transmission, wherein the layer is the one to which a stream with a maximum broadband CQI corresponds;

ii) under a condition that the number of receiving antennae and the number of transmitting antennae are both 4:

1) when the number of layers to which an RI recently reported by the UE corresponds is 4, and a currently employed number of layers is 3, a precoder obtained by removing a precoding vector, to which layer 1 or layer 2 corresponds, from a precoder recently reported by the UE is applied to the current MIMO transmission;

2) when the number of layers to which the RI recently reported by the UE corresponds is 4, and the currently employed number of layers is 2, a precoder obtained by removing a precoding vector, to which layer 1 or layer 2 corresponds, and simultaneously removing a precoding vector, to which layer 3 or layer 4 corresponds from a precoder recently reported by the UE is applied to the current MIMO transmission;

3) when the number of layers to which the RI recently reported by the UE corresponds is 4, and the currently employed number of layers is 1, any one of two precoding vectors to which a layer corresponds is selected as the precoder employed by the current MIMO transmission, wherein the layer is the one to which a stream with a maximum broadband CQI corresponds;

4) when the number of layers to which the RI recently reported by the UE corresponds is 3, and the currently employed number of layers is 2, a precoder obtained by removing a precoding vector, to which layer 2 or layer 3 corresponds, from a precoder recently reported by the UE is applied to the current MIMO transmission;

5) when the number of layers to which the RI recently reported by the UE corresponds is 3, and the currently employed number of layers is 1, a precoding vector or any one of two precoding vectors to which a layer corresponds is selected as the precoder employed by the current MIMO transmission, wherein the layer is the one to which a stream with a maximum broadband CQI corresponds; and 6) when the number of layers to which the RI recently reported by the UE corresponds is 2, and the currently employed number of layers is 1, a precoding vector to which a layer corresponds is selected as the precoder employed by the current MIMO transmission, wherein the layer is the one to which a stream with a maximum broadband CQI corresponds.

Note that, the method for processing a precoder of the present invention is suitable for the MIMO transmission modes except the open-loop MIMO transmission mode, such as the closed-loop MIMO transmission mode, multi-user MIMO transmission mode and the closed-loop MIMO transmission mode with RI being 1. Note that, the RI recently reported by the UE includes the current TTI.

The above are the preferable embodiments of the method for processing a precoder of the present invention. Two specific embodiments of the present invention are described below.

Embodiment 1

In this embodiment, regarding the MIMO channel formed by transmitting antennae with $N_T$ being 2 and receiving antennae with $N_R$ being 2, the transmission mode of the UE is the closed-loop MIMO transmission mode; the length of the precoder reception window aiming at the UE, i.e. L is set as 20 milliseconds, the threshold a is set as 4, the threshold c is set as 1, and the threshold d is set as 2.

At a certain time, the precoders in the precoder reception window of the UE are {(1, 0), (1, 0), (1, 2), (1, 0), (1, 2), (1, 0)}, respectively, wherein the second element in the parentheses '( )' representing the precoder represents the Precoding Matrix Index (PMI) reported by the UE, the first element in the parentheses '( )' representing the precoder represents the number of layers to which the RI corresponds, wherein the RI is the one that the PMI reported by the UE is according to; regarding the base station, the RI and the number of layers are in corresponding relation, i.e., the number of layers is RI added with 1. It can be known from Table 1 that (1, 0) represents that the precoder reported by the UE is $$\frac{1}{\sqrt{2}}\begin{bmatrix}1\\1\end{bmatrix},$$

and (1, 2) represents that the precoder reported by the UE is $$\frac{1}{\sqrt{2}}\begin{bmatrix}1\\j\end{bmatrix}.$$

Step 1: if it is known from determination that the precoders in the precoder reception window are full, which means the number of precoders reported by the UE and received by the base station are greater than the threshold a, then execute the next step.

Step 2: if it is known from determination that each precoder in the precoder reception window is according to the same number of layers (which is 1), then execute the next step.

Step 3: the variation speed of each precoder in the precoder reception window in each layer is sequentially determined, comprising steps as follows.

First, the variation speed of each precoder in the precoder reception window in the layer 1 is determined, wherein the variation speed of element at the same position of vector of each precoder in the precoder reception window in the layer 1 is determined, comprising steps as follows.

Step 3.1: it is determined that the distribution of element at the first position of vector of each precoder in the precoder reception window in the layer 1 is in the set {a0} in FIG. 1, so the distribution type is the static distribution; furthermore, it can be determined that the variation of element at the first position of vector of each precoder in the precoder reception window in the layer 1 is slow.

Step 3.2: it is determined that the distribution of element at the second position of vector of each precoder in the precoder reception window in the layer 1 is in the set {a0, a1} in FIG. 1, so the distribution type is the correlation distribution; furthermore, it can be determined that the variation of element at the second position of vector of each precoder in the precoder reception window in the layer 1 is slow.

Thereby, the variation of each precoder in the precoder reception window in the layer 1 is slow.

Step 4: the number of layers that each precoder in the precoder reception window is according to is 1, and it can be known from Step 3 that the variation of each precoder in the precoder reception window in the layer 1 is slow, so the precoder recently reported by the UE is employed by the MIMO transmission. At this point, the flow of determining the transmission mode employed by the UE and the precoder employed by the transmission mode in the present embodiment is finished.

Embodiment 2

In this embodiment, regarding the MIMO channel formed by transmitting antennae with $N_T$ being 4 and receiving antennae with $N_R$ being 4, the transmission mode of the UE is the closed-loop MIMO transmission mode; the length of the precoder reception window aiming at the UE, i.e. L is set as 24 milliseconds, the threshold a is set as 5, the threshold c is set as 1, and the threshold d is set as 4.

At a certain time, the precoders in the precoder reception window of the UE are {(1, 0), (1, 1), (1, 2), (1, 2), (1, 3), (2, 0), (2, 1), (2, 0)}, respectively; according to Table. 2, (2, 0) represents that the precoder reported by the UE is $$\frac{1}{\sqrt{2}}\begin{bmatrix} 0.5 & 0.5 \\ 0.5 & -0.5 \\ 0.5 & -0.5 \\ 0.5 & 0.5 \end{bmatrix};$$

the number of layers used by the UE at this time is set as 1, the broadband CQI of stream 1 reported by the UE at this time is 5, and the reported broadband CQI of stream 2 is 6.

Step 1: if it is known from determination that the precoders in the precoder reception window are full, then execute the next step.

Step 2: if it is known from determination that precoders in the precoder reception window are not according to the same number of layers, then aiming at the situation that the numbers of layers that the precoders in the precoder reception window are according to are different, the following processing procedures are performed.

Step 2.1: all the precoding matrixes, which are reported according to the recently reported RI, in the precoder reception window are reserved, and the other precoding matrixes in the precoder reception window are cleared, i.e., the precoders in the precoder reception window of the UE are {(2, 0), (2, 1), (2, 0)}.

Step 2.2: it is determined that the number of layers that the precoders of the UE are according to at this time is greater than that used at this time, the number of layers that the precoders are according to at this time is 2, and the number of layers used at this time is 1; the broadband CQI of stream 1 reported by the UE at this time is 5, and the reported broadband CQI of stream 2 is 6, so the precoding vector $$\begin{bmatrix} 0.5 \\ -0.5 \\ -0.5 \\ 0.5 \end{bmatrix}$$

to which the layer 2 corresponds is selected as the precoder at this time to perform the MIMO transmission, wherein the layer 2 is the one to which the stream 2 corresponds. Wherein the number of layers that the precoders are according to at this time is that to which the RI recently reported by the UE and received by the base station corresponds. At this point, the flow of determining the transmission mode employed by the UE and the precoder employed in the transmission mode in the present embodiment is finished.

Correspondingly, an embodiment of the present invention further provides an apparatus for processing a precoder; the apparatus for processing a precoder of the embodiment is described below with reference to FIG. 6 in detail.

Figure 6:
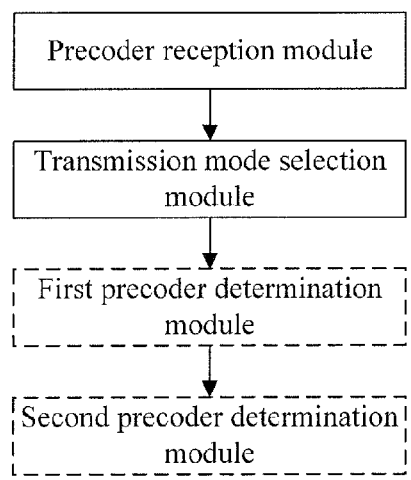
FIG. 6 shows a structural diagram of an apparatus for processing a precoder according to the present invention.

FIG. 6 shows a structural diagram of an apparatus for processing a precoder according to an embodiment of the present invention; as shown in FIG. 6, the apparatus for processing a precoder according to the embodiment of the present invention comprises: a precoder reception module and a transmission mode selection module.

In the above, the precoder reception module is used for receiving precoders and a rank indicator reported by a UE; and the transmission mode selection module is used for determining whether the number of effective precoders reported by the UE and received by a base station is greater than or equal to a threshold a, if the number of effective precoders is greater than or equal to the threshold a, further determining whether each received effective precoder is according to the same number of layers, if each received effective precoder is according to the same number of layers, further determining whether a variation speed of each effective precoder is fast, if the variation speed is fast, determining that the base station applies a transmit diversity transmission mode to the UE, otherwise, determining that the base station applies a MIMO transmission mode to the UE; wherein the effective precoders are precoders reported by the UE and received by the base station in a most recent period L.

Furthermore, the transmission mode selection module is used for determining which transmission mode is applied by the base station to a certain UE according to the following solution.

A: it is determine whether the number of effective precoders reported by the UE and received by the base station is greater than or equal to a threshold a, if so, execute Step B, otherwise, execute Step D.

In the above, the effective precoders received by the base station mean that the precoders reported by the UE are on an effective time domain. The effective time domain means the time range of L milliseconds from the L−1 milliseconds before the current time to the current time, wherein L ranges from 8 milliseconds to 200 milliseconds. The value of L should ensure the number of effective precoders reported by the UE can be greater than the threshold a, and the threshold a ranges from 4 to 10.

B: it is determined whether each received effective precoder is according to the same number of layers, if so, execute Step C, otherwise, execute Step D.

C: it is determined whether the variation of each effective precoder is fast according to the predetermined rule of variation speed of a precoder, if so, the transmit diversity transmission mode is applied to the UE, otherwise, the MIMO transmission mode is applied to the UE.

The variation of each effective precoder is the successive relation formed by each effective precoder that is received by the base station successively.

D: the MIMO transmission mode is applied to the UE.

In the embodiment, the predetermined rule of variation speed of a precoder in Step C is: according to a predetermined rule of determining the variation speed of vector of each precoder in the layer that each effective precoder is according to, the variation speed of vector of each effective precoder in each layer is determined respectively; if the number of the layers in which the variation of vector of each effective precoder is fast reaches a preset threshold d, then the variation speed of each effective precoder is considered to be fast; wherein the layers are those that each effective precoder is according to, i.e., those corresponding to the rank indicator; the threshold d is an integer which is greater than or equal to 1 and less than or equal to the number of layers that each effective precoder is according to, for example, the threshold d can be set as the number of layers that each effective precoder is according to.

In the above, the variation of vector of each effective precoder in each layer is a successive relation formed by the vectors, in the layer, of each effective precoder that is received by the base station successively.

The above apparatus for processing a precoder further comprises a first precoder determination module and a second precoder determination module.

The first precoder determination module is used for selecting Step C in the above solution aiming at the transmission mode employed by the transmission mode selection module, if it is determined to apply the MIMO transmission mode to the UE in the step, then the first precoder determination module determines the precoder that should be employed by the current MIMO transmission according to the following solution:

the base station employs the precoder recently reported by the UE to perform the MIMO transmission, but if there exist a layer in which the variation of vector of each effective precoder is fast according to the predetermined rule of determining the variation speed of vector of each precoder in the layers that each effective precoder is according to, then the precoder employed by the base station is the one obtained by removing, from the precoder recently reported by the UE, the vector to which the layer with fast variation speed corresponds.

The second precoder determination module is used for selecting Step D in the above solution aiming at the transmission mode employed by the transmission mode selection module, and then determining the precoder that should be employed by the current MIMO transmission according to the following solution:

I) when the number of layers to which the RI recently reported by the UE corresponds is less than or equal to that employed currently, the precoder recently reported by the UE is employed to perform the MIMO transmission;

II) when the number of layers to which the RI recently reported by the UE corresponds is greater than that employed currently, the following processing procedures are performed:

i) under a condition that the number of receiving antennae and the number of transmitting antennae are both 2, a precoding vector to which a layer corresponds is selected from a precoder recently reported by the UE as the precoder employed by the current MIMO transmission, wherein the layer is the one to which a stream with a maximum broadband CQI corresponds;

ii) under a condition that the number of receiving antennae and the number of transmitting antennae are both 4:

1) when the number of layers to which an RI recently reported by the UE corresponds is 4, and a currently employed number of layers is 3, a precoder obtained by removing a precoding vector, to which layer 1 or layer 2 corresponds, from a precoder recently reported by the UE is applied to the current MIMO transmission;

2) when the number of layers to which the RI recently reported by the UE corresponds is 4, and the currently employed number of layers is 2, a precoder obtained by removing a precoding vector, to which layer 1 or layer 2 corresponds, and simultaneously removing a precoding vector, to which layer 3 or layer 4 corresponds from a precoder recently reported by the UE is applied to the current MIMO transmission;

3) when the number of layers to which the RI recently reported by the UE corresponds is 4, and the currently employed number of layers is 1, any one of two precoding vectors to which a layer corresponds is selected as the precoder employed by the current MIMO transmission, wherein the layer is the one to which a stream with a maximum broadband CQI corresponds;

4) when the number of layers to which the RI recently reported by the UE corresponds is 3, and the currently employed number of layers is 2, a precoder obtained by removing a precoding vector, to which layer 2 or layer 3 corresponds, from a precoder recently reported by the UE is applied to the current MIMO transmission;

5) when the number of layers to which the RI recently reported by the UE corresponds is 3, and the currently employed number of layers is 1, a precoding vector or any one of two precoding vectors to which a layer corresponds is selected as the precoder employed by the current MIMO transmission, wherein the layer is the one to which a stream with a maximum broadband CQI corresponds; and 6) when the number of layers to which the RI recently reported by the UE corresponds is 2, and the currently employed number of layers is 1, a precoding vector to which a layer corresponds is selected as the precoder employed by the current MIMO transmission, wherein the layer is the one to which a stream with a maximum broadband CQI corresponds.

Note that, in the above description, the precoder and the precoding matrix are the same concept; when the precoding matrix has only one column, the precoding matrix is the precoding vector.

The above-mentioned specific embodiments further describe the aim, the technical solution and the beneficial effect of the present invention in detail; note that, the above is only the specific embodiments of the present invention; those skilled in the art can perform various modifications and equivalent replacements on the present invention without departing from the scope and spirit of the present invention. Thus, provided that these modifications and equivalent replacements of the present invention are within the scope of the claims of the present invention and equivalent technology thereof, the present invention is intended to comprise these modifications and equivalent replacements.

What is claimed is:

1. A method for selecting a transmission mode, comprising:

step A: a base station determining whether the number of received effective precoders reported by a User Equipment (UE) is greater than or equal to a threshold a, if so, executing step B, otherwise, executing step D;

step B: determining whether each received effective precoder is according to the same number of layers, if so, executing step C, otherwise, executing step D;

step C: determining whether a variation speed of each effective precoder is fast, if so, applying a transmit diversity transmission mode to the UE, and ending the flow, otherwise, applying a Multi-Input and Multi-Output (MIMO) transmission mode to the UE, and ending the flow; and step D: applying a MIMO transmission mode to the UE;

wherein the effective precoders are precoders reported by the UE and received by the base station in a most recent period L.

2. The method for selecting a transmission mode according to claim 1, wherein the period L ranges from 8 milliseconds to 200 milliseconds, and the threshold a ranges from 4 to 10.

3. The method for selecting a transmission mode according to claim 1, wherein determining whether the variation speed of each effective precoder is fast in step C comprises:

in the layers that each effective precoder is according to, respectively determining, according to a rule of determining the variation speed of vector of each effective precoder, the variation speed of vector of each effective precoder in each layer; if the number of layers in which the variation speed of vector of each effective precoder is fast reaches a preset threshold d, then considering the variation speed of each effective precoder to be fast;

wherein the threshold d is an integer which is greater than or equal to 1 and less than or equal to the number of layers that each effective precoder is according to.

4. The method for selecting a transmission mode according to claim 3, wherein in the layers that each effective precoder is according to, the rule of determining the variation speed of vector of each effective precoder comprises:

in a layer, sequentially determining, according to a rule of determining a variation speed of element at the same position of vector of each effective precoder, the variation speed of element at each same position of vector of each precoder; if the number of positions at which the variation speed is fast is greater than a threshold c, then considering the variation speed of vector of each precoder to be fast in the layer, otherwise, considering the variation speed of vector of each precoder to be not fast in the layer;

wherein the threshold c is an integer which is greater than or equal to 1 and less than or equal to the number of elements in the vector of the effective precoder.

5. The method for selecting a transmission mode according to claim 4, wherein the rule of determining the variation speed of element at the same position of vector of each effective precoder in the layer comprises:

step 1: presetting a precoder reception window and a precoder trend determination window;

step 2: dividing a distribution type of elements at the same position of the precoding vector of each precoder, which is in the precoder reception window and the precoder trend determination window, in the layer; and step 3: making the following determination based on step 1 and step 2:

when the distribution type in the precoder reception window is static distribution or correlation distribution, considering the variation speed of element at the same position of the vector of each effective precoder to be not fast in the layer;

when the distribution type in the precoder reception window is jump distribution, further determining whether the distribution type in the precoder trend determination window is static distribution, if so, considering the variation speed of element at the same position of the vector of each effective precoder to be not fast in the layer, otherwise, considering the variation speed of element at the same position of the vector of each effective precoder to be fast; and when the distribution type in the precoder reception window is regional distribution or scattered distribution, further determining whether the distribution type in the precoder trend determination window is static distribution or correlation distribution, if it is static distribution, considering the variation speed of element at the same position of the vector of each effective precoder to be not fast in the layer, if it is correlation distribution, considering the variation speed of element at the same position of the vector of each effective precoder to be fast.

6. The method for selecting a transmission mode according to claim 1, wherein step C further comprises: if it is determined to apply the MIMO transmission mode to the UE, then determining a precoder that should be employed by a current MIMO transmission according to the following solution:

the base station employs a precoder recently reported by the UE to perform the MIMO transmission, but if there exists a layer in which the variation of vector of each effective precoder is fast, then the precoder employed by the base station is the one obtained by removing, from the precoder recently reported by the UE, the vector to which the layer with fast variation speed corresponds.

7. The method for selecting a transmission mode according to claim 1, wherein step D further comprises: determining a precoder that should be employed by a current MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

8. An apparatus for selecting a transmission mode, comprising a precoder reception module and a transmission mode selection module, wherein the precoder reception module is used for receiving a precoder reported by a user equipment (UE); and the transmission mode selection module is used for determining whether the number of effective precoders reported by the UE and received by a base station is greater than or equal to a threshold a, if the number of effective precoders is greater than or equal to the threshold a, further determining whether each received effective precoder is according to the same number of layers, if each received effective precoder is according to the same number of layers, further determining whether a variation speed of each effective precoder is fast, if the variation speed is fast, determining that the base station applies a transmit diversity transmission mode to the UE, otherwise, determining that the base station applies a Multi-Input and Multi-Output (MIMO) transmission mode to the UE;

wherein the effective precoders are precoders reported by the UE and received by the base station in a most recent period L.

9. The apparatus for selecting a transmission mode according to claim 8, further comprising:

a first precoder determination module, for determining a precoder that should be employed by a current MIMO transmission according to the following solution:

the base station employs a precoder recently reported by the UE to perform the MIMO transmission, but if there exists a layer in which the variation speed of vector of each effective precoder is fast, then the precoder employed by the base station is the one obtained by removing, from the precoder recently reported by the UE, the vector to which the layer with fast variation speed corresponds.

10. The apparatus for selecting a transmission mode according to claim 8, further comprising:

a second precoder determination module, for determining a precoder that should be employed by the MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

11. The method for selecting a transmission mode according to claim 2, wherein step C further comprises: if it is determined to apply the MIMO transmission mode to the UE, then determining a precoder that should be employed by a current MIMO transmission according to the following solution:

the base station employs a precoder recently reported by the UE to perform the MIMO transmission, but if there exists a layer in which the variation of vector of each effective precoder is fast, then the precoder employed by the base station is the one obtained by removing, from the precoder recently reported by the UE, the vector to which the layer with fast variation speed corresponds.

12. The method for selecting a transmission mode according to claim 3, wherein step C further comprises: if it is determined to apply the MIMO transmission mode to the UE, then determining a precoder that should be employed by a current MIMO transmission according to the following solution:

the base station employs a precoder recently reported by the UE to perform the MIMO transmission, but if there exists a layer in which the variation of vector of each effective precoder is fast, then the precoder employed by the base station is the one obtained by removing, from the precoder recently reported by the UE, the vector to which the layer with fast variation speed corresponds.

13. The method for selecting a transmission mode according to claim 4, wherein step C further comprises: if it is determined to apply the MIMO transmission mode to the UE, then determining a precoder that should be employed by a current MIMO transmission according to the following solution:

the base station employs a precoder recently reported by the UE to perform the MIMO transmission, but if there exists a layer in which the variation of vector of each effective precoder is fast, then the precoder employed by the base station is the one obtained by removing, from the precoder recently reported by the UE, the vector to which the layer with fast variation speed corresponds.

14. The method for selecting a transmission mode according to claim 5, wherein step C further comprises: if it is determined to apply the MIMO transmission mode to the UE, then determining a precoder that should be employed by a current MIMO transmission according to the following solution:

the base station employs a precoder recently reported by the UE to perform the MIMO transmission, but if there exists a layer in which the variation of vector of each effective precoder is fast, then the precoder employed by the base station is the one obtained by removing, from the precoder recently reported by the UE, the vector to which the layer with fast variation speed corresponds.

15. The method for selecting a transmission mode according to claim 2, wherein step D further comprises: determining a precoder that should be employed by a current MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

16. The method for selecting a transmission mode according to claim 3, wherein step D further comprises: determining a precoder that should be employed by a current MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

17. The method for selecting a transmission mode according to claim 4, wherein step D further comprises: determining a precoder that should be employed by a current MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

18. The method for selecting a transmission mode according to claim 5, wherein step D further comprises: determining a precoder that should be employed by a current MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

19. The apparatus for selecting a transmission mode according to claim 9, further comprising:

a second precoder determination module, for determining a precoder that should be employed by the MIMO transmission according to the following solution:

when the number of layers to which a Rank Indicator (RI) recently reported by the UE corresponds is less than or equal to the number of layers employed currently, employing a precoder recently reported by the UE to perform the MIMO transmission;

when the number of layers to which the RI recently reported by the UE corresponds is greater than the number of layers employed currently, employing the following processing procedure:

under a condition that the number of receiving antennae and the number of transmitting antennae are both 2, selecting, from a precoder recently reported by the UE, a precoding vector to which a layer corresponds as the precoder employed by the current MIMO transmission, wherein the layer is the one to which a stream with a maximum broadband Channel Quality Indicator (CQI) corresponds;

under a condition that the number of receiving antennae and the number of transmitting antennae are both 4:

when the number of layers to which an RI recently reported by the UE corresponds is 4, and a currently employed number of layers is 3, applying a precoder obtained by removing a precoding vector, to which layer 1 or layer 2 corresponds, from a precoder recently reported by the UE to perform the current MIMO transmission;

when the number of layers to which the RI recently reported by the UE corresponds is 4, and the currently employed number of layers is 2, applying a precoder obtained by removing a precoding vector, to which layer 1 or layer 2 corresponds, and simultaneously removing a precoding vector, to which layer 3 or layer 4 corresponds from a precoder recently reported by the UE to perform the current MIMO transmission;

when the number of layers to which the RI recently reported by the UE corresponds is 4, and the currently employed number of layers is 1, selecting any one of two precoding vectors to which a layer corresponds as the precoder employed by the current MIMO transmission, wherein the layer is the one to which a stream with a maximum broadband CQI corresponds;

when the number of layers to which the RI recently reported by the UE corresponds is 3, and the currently employed number of layers is 2, applying a precoder obtained by removing a precoding vector, to which layer 2 or layer 3 corresponds, from a precoder recently reported by the UE to perform the current MIMO transmission;

when the number of layers to which the RI recently reported by the UE corresponds is 3, and the currently employed number of layers is 1, selecting a precoding vector or any one of two precoding vectors to which a layer corresponds as the precoder employed by the current MIMO transmission, wherein the layer is the one to which a stream with a maximum broadband CQI corresponds; and when the number of layers to which the RI recently reported by the UE corresponds is 2, and the currently employed number of layers is 1, selecting a precoding vector to which a layer corresponds as the precoder employed by the current MIMO transmission, wherein the layer is the one to which a stream with a maximum broadband CQI corresponds.

* * * * *